(12) United States Patent
Jang et al.

(10) Patent No.: US 12,238,419 B2
(45) Date of Patent: Feb. 25, 2025

(54) SENSOR SHIFTING MODULE AND CAMERA MODULE INCLUDING THE SAME

(71) Applicant: Samsung Electro-Mechanics Co., Ltd., Suwon-si (KR)

(72) Inventors: Su Bong Jang, Suwon-si (KR); Sang Jong Lee, Suwon-si (KR); Hee Soo Yoon, Suwon-si (KR); Tae Ho Yun, Suwon-si (KR); Seung Jae Song, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 175 days.

(21) Appl. No.: 17/965,224

(22) Filed: Oct. 13, 2022

(65) Prior Publication Data

US 2023/0156334 A1 May 18, 2023

(30) Foreign Application Priority Data

Nov. 15, 2021 (KR) .................. 10-2021-0156826

(51) Int. Cl.
*H04N 23/68* (2023.01)
*G02B 7/02* (2021.01)
*H01F 7/08* (2006.01)

(52) U.S. Cl.
CPC .......... *H04N 23/687* (2023.01); *H01F 7/081* (2013.01); *G02B 7/021* (2013.01)

(58) Field of Classification Search
CPC .......... G02B 7/021; G02B 7/08; H01F 7/081; H01F 7/20; H04N 23/54; H04N 23/687
See application file for complete search history.

(56) References Cited

U.S. PATENT DOCUMENTS

| | | | |
|---|---|---|---|
| 9,832,381 B2 * | 11/2017 | Osborne | H04N 23/90 |
| 10,890,734 B1 | 1/2021 | Sharma et al. | |
| 2011/0236008 A1 | 9/2011 | Kang et al. | |
| 2012/0169920 A1 * | 7/2012 | Mukai | H04N 23/54 |
| | | | 348/E5.025 |

(Continued)

FOREIGN PATENT DOCUMENTS

| | | |
|---|---|---|
| CN | 107533273 A | 1/2018 |
| CN | 110855874 A | 2/2020 |

(Continued)

OTHER PUBLICATIONS

Korean Office Action Issued on Feb. 8, 2023, in Counterpart Korean Patent Application No. 10-2021-0156826 (8 Pages in English, 6 Pages in Korean).

(Continued)

*Primary Examiner* — Amy R Hsu
(74) *Attorney, Agent, or Firm* — NSIP Law

(57) ABSTRACT

A sensor shifting module includes a fixed body, a first movable body movably disposed on the fixed body and coupled to an image sensor having an imaging plane oriented in a first direction, and a first driver configured to rotate the first movable body about an axis orthogonal to the first direction with respect to the fixed body, wherein the first driver includes a tilt guide ball disposed between the fixed body and the first movable body to provide a tilt center for the first movable body with respect to the fixed body.

20 Claims, 18 Drawing Sheets

(56) References Cited

U.S. PATENT DOCUMENTS

| | | | |
|---|---|---|---|
| 2016/0127646 A1* | 5/2016 | Osborne | H04N 23/6812 |
| | | | 396/55 |
| 2018/0113273 A1 | 4/2018 | Lee et al. | |
| 2018/0217475 A1 | 8/2018 | Goldenberg et al. | |
| 2019/0049687 A1* | 2/2019 | Bachar | G02B 27/646 |
| 2019/0104239 A1 | 4/2019 | Aschwanden et al. | |
| 2020/0120283 A1 | 4/2020 | Min | |
| 2021/0173223 A1 | 6/2021 | Seo et al. | |
| 2021/0373278 A1 | 12/2021 | Kim et al. | |
| 2023/0171475 A1* | 6/2023 | Jang | H04N 23/54 |
| | | | 348/373 |

FOREIGN PATENT DOCUMENTS

| | | |
|---|---|---|
| CN | 112839176 A | 5/2021 |
| CN | 112868222 A | 5/2021 |
| EP | 4 102 820 A1 | 12/2022 |
| KR | 10-2011-0106664 A | 9/2011 |
| KR | 10-2016-0060219 A | 5/2016 |
| KR | 10-2017-0091398 A | 8/2017 |
| KR | 10-2018-0118720 A | 10/2018 |
| KR | 10-2021-0073324 A | 6/2021 |
| KR | 10-2021-0100430 A | 8/2021 |

OTHER PUBLICATIONS

Chinese Office Action issued on Dec. 30, 2024, in counterpart Chinese Patent Application No. 202211411324.5 (6 pages in English, 9 pages in Chinese).

* cited by examiner

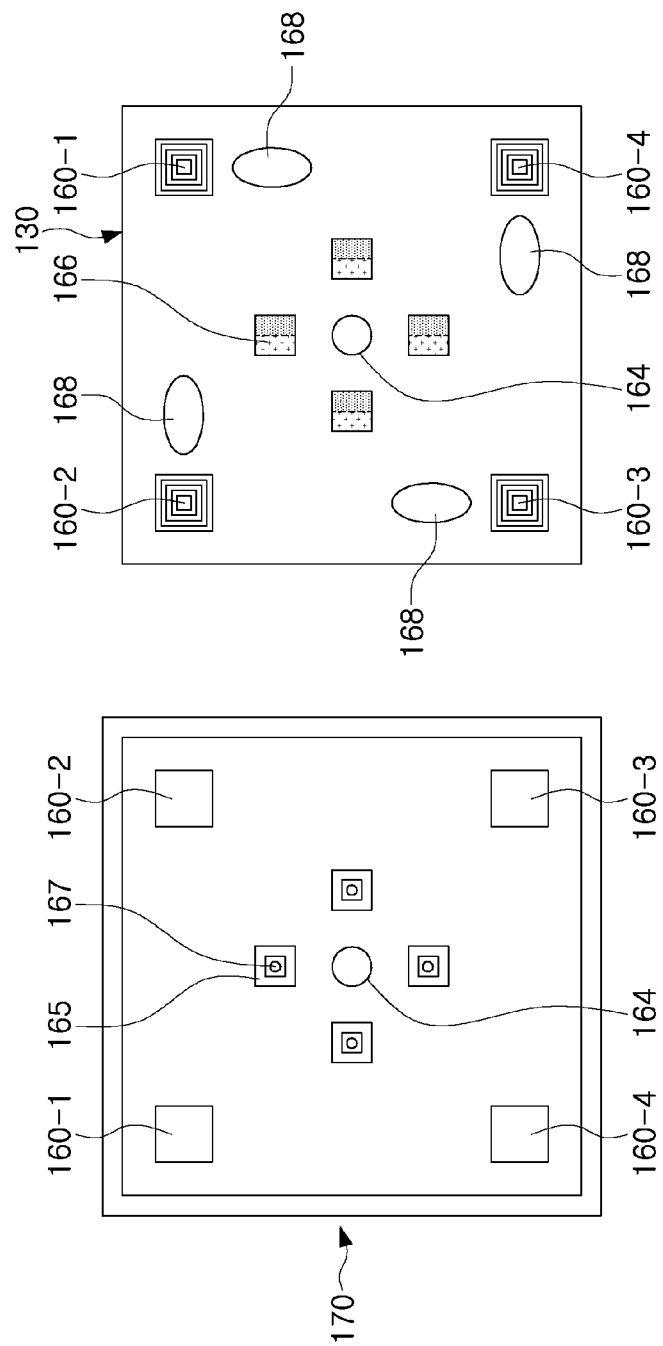

SENSOR SHIFTING MODULE AND CAMERA MODULE INCLUDING THE SAME

CROSS-REFERENCE TO RELATED APPLICATIONS

This application claims the benefit under 35 USC 119(a) of Korean Patent Application No. 10-2021-0156826 filed on Nov. 15, 2021, in the Korean Intellectual Property Office, the entire disclosure of which is incorporated herein by reference for all purposes.

BACKGROUND

1. Field

The present disclosure relates to an optical image stabilization device and a camera module comprising the same.

2. Description of the Background

With the development of communications technology, mobile devices such as a smartphone, may be widely distributed, and accordingly, functions of a camera included in mobile devices may also be in increasing demand. For example, a camera included in a mobile device may be designed to provide advanced imaging functions (e.g., an autofocus function, an anti-shake function, and the like) implemented in a general digital single-lens reflex camera (DSLR) camera despite a small size thereof.

Optical image stabilization (OIS) function may prevent image blur occurring when a camera is shaken during the exposure time, and the OIS function may be necessary when imaging in low-light environment in which a camera is shaken and the exposure time is relatively long. The OIS may include digital IS (DIS), electronic IS (EIS), and optical IS (OIS). Among these functions, optical IS (OIS) may fundamentally prevent image deterioration caused by shaking by correcting an optical path by moving a lens or image sensor in a direction orthogonal to the optical axis. Since a mechanical actuator is necessary, it may be complicated to be implemented as a device, and although relevant costs are expensive, excellent compensation performance may be obtained.

A lens barrel may include an optical system therein, such that a relatively large amount of force may be required to drive the lens barrel. An image sensor may be relatively light, such that it may be advantageous to implement an excellent OIS function even with a relatively small amount of force. However, when an actuator for driving the image sensor includes a permanent magnet, a magnetic field due to the permanent magnet may affect neighboring electronic components. Also, when a mobile device includes a plurality of cameras disposed adjacently to each other, a permanent magnet in each camera may negatively affect operations of neighboring cameras such that it may be difficult to dispose the cameras to be adjacent to each other or to dispose electronic components in the camera.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a sensor shifting module includes a fixed body, a first movable body movably disposed on the fixed body and coupled to an image sensor having an imaging plane oriented in a first direction, and a first driver configured to rotate the first movable body about an axis orthogonal to the first direction with respect to the fixed body, wherein the first driver includes a tilt guide ball disposed between the fixed body and the first movable body to provide a tilt center for the first movable body with respect to the fixed body.

The first driver may include a tilt actuator disposed between the fixed body and the first movable body, and the tilt actuator may include a first driving element disposed on one of the first movable body and the fixed body, and a second driving element disposed on the other of the first movable body and the fixed body, one of the first driving element and the second driving element may be a coil, and the other may be one of a coil, a magnet, and a yoke, and the first movable body may rotate by electromagnetic interaction between the first driving element and the second driving element.

The first driver may include a first magnetic member and a second magnetic member disposed on the fixed body and the first movable body, respectively, and opposing each other in the first direction.

One of the first magnetic member and the second magnetic member may be a magnet, the other may be a yoke including a through portion therein, and the first driver may include a position sensor disposed in the through portion.

The first driver may include an elastic member disposed between the fixed body and the first movable body, and the elastic member may be compressed according to tilting of the first movable body.

The elastic member may be a leaf spring bent to be curved toward the fixed body or the first movable body.

The sensor shifting module may further include a second movable body movably disposed on the first movable body and coupled to the image sensor, and a second driver configured to move the second movable body in a direction orthogonal to the first direction with respect to the first movable body, the second driver may include a driving coil coupled to one of the first movable body and the second movable body, and a driving yoke coupled to the other, the driving yoke may oppose the driving coil in a direction orthogonal to the first direction, and when a current is applied to the driving coil, the second movable body may move in a direction orthogonal to the first direction by electromagnetic interaction between the driving coil and the driving yoke.

The driving yoke may be a soft magnetic material.

The second driver may further include a yoke disposed on one side of the driving coil, and the driving coil may be disposed between the driving yoke and the yoke.

The sensor shifting module may further include a substrate mechanically connecting the second movable body to the first movable body and being deformed according to movement of the second movable body with respect to the first movable body.

The substrate may include electrical traces electrically connected to the image sensor.

The substrate may include a movable portion fixedly coupled to the second movable body, a fixed portion fixedly coupled to the first movable body, and a supporting portion interconnecting the movable portion to the fixed portion, and the supporting portion may include a plurality of bridges embedding the electrical traces therein.

The supporting portion may include a guide disposed between the movable portion and the fixed portion and connected to the movable portion and the fixed portion through the plurality of bridges.

The plurality of bridges may include first bridges extending from the movable portion to the guide in a second direction orthogonal to the first direction and second bridges extending from the guide to the fixed portion in a third direction orthogonal to the first direction, and the second direction and the third direction intersect each other.

A camera module may include the sensor shifting module, and a lens barrel including at least one lens, wherein light incident through the at least one lens may strike the imaging plane in the first direction.

In another general aspect, a camera module includes a lens module including at least one lens; and a sensor shifting module, wherein the sensor shifting module includes a fixed body, a first movable body movably disposed on the fixed body and coupled to an image sensor oriented in a first direction, and a first driver configured to rotate the first movable body about an axis orthogonal to the first direction with respect to the fixed body, wherein the first driver includes a tilt actuator disposed between the fixed body and the first movable body, and the tilt actuator includes a first driving element disposed on one of the first movable body and the fixed body and a second driving element disposed on the other of the first movable body and the fixed body, wherein one of the first driving element and the second driving element is a coil, and the other is one of a coil, a magnet, and a yoke, and wherein the first movable body rotates by electromagnetic interaction between the first driving element and the second driving element.

The camera module may further include a second movable body movably disposed on the first movable body and coupled to the image sensor, and a second driver configured to move the second movable body in a direction orthogonal to the first direction with respect to the first movable body, the second driver may include a driving coil coupled to one of the first movable body and the second movable body, and a driving yoke coupled to the other, the driving yoke may oppose the driving coil in a direction orthogonal to the first direction, and when a current is applied to the driving coil, the second movable body may move in a direction orthogonal to the first direction by electromagnetic interaction arising between the driving coil and the driving yoke.

In another general aspect, a sensor shifting module includes an image sensor having an imaging plane oriented in a first direction, a tilt guide ball, a first movable body rotatably disposed on the tilt ball and supporting the image sensor, and a tilt actuator configured to rotate the first movable body about an axis through the tilt guide ball orthogonal to the first direction, wherein the tilt actuator includes a first driving element disposed on the first movable body and a second driving element facing the first driving element in the first direction, wherein, the first driving element is a coil or a yoke, and when the first driving element is a coil, the second driving element is a coil or a yoke, and when the first driving element is a yoke, the second driving element is a coil, and wherein the first movable body rotates by electromagnetic interaction between the first driving element and the second driving element.

Other features and aspects will be apparent from the following detailed description, the drawings, and the claims.

BRIEF DESCRIPTION OF DRAWINGS

FIG. 2D illustrates a bottom surface of the fixed body 170 and a lower surface of the first movable body 130 in an example embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
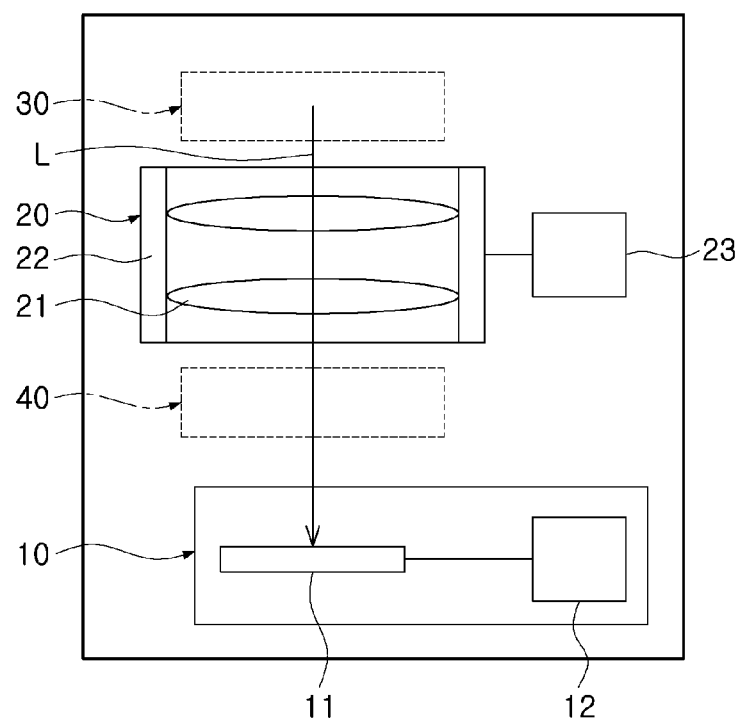
FIG. 1 is a diagram illustrating components included in a camera module according to an example embodiment of the present disclosure.

Hereinafter, while example embodiments of the present disclosure will be described in detail with reference to the accompanying drawings as follows, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, e.g., as to what an example or embodiment may include or implement, means that at least one example or embodiment exists in which such a feature is included or implemented while all examples and examples are not limited thereto.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

In the example embodiments, the X-direction, the Y-direction, and the Z direction may refer to a direction parallel to the X axis, a direction parallel to the Y axis, and a direction parallel to the Z axis, respectively, in the drawings. Also, unless otherwise indicated, the X-direction may include both the +X-axis direction and the −X-axis direction, which may also apply to the Y-direction and the Z direction.

In the example embodiments, two directions (or axes) are parallel to each other may also include the examples in which the two directions (or axes) are substantially parallel to or substantially side by side to each other. In the example embodiments, two directions orthogonal to each other may also include the examples in which the two directions (or axes) are substantially perpendicular to or substantially 90 degrees to each other. For example, the configuration in which the first axis and the second axis are orthogonal to each other may indicate that the first axis and the second axis may form an angle of 90 degrees or approximate to 90 degrees.

"An example embodiment" does not necessarily indicate the same example embodiments. The particular features, structures, or characteristics may be combined in any suitable manner consistent with the example embodiments.

In the example embodiments, "configured to" may indicate that a component may include a structure necessary to implement a function.

The features of the examples described herein may be combined in various manners as will be apparent after gaining an understanding of this disclosure. Further, although the examples described herein have a variety of configurations, other configurations are possible as will be apparent after gaining an understanding of this disclosure.

One or more example embodiments of the present disclosure may enable a camera to provide effective optical image stabilization with low power, or to eliminate or reduce an effect of a magnetic field of an actuator for driving an image sensor. For example, the effect of the magnetic field of an actuator for driving an image sensor on electronic components disposed outside of a camera may be reduced or eliminated.

1. Camera Module

FIG. 1 is a diagram illustrating components included in a camera module 1 according to an example embodiment.

In an example embodiment, the camera module 1 may include a lens module 20 including at least one lens 21 and a lens barrel 22 accommodating the at least one lens 21, and an image sensor 11. Light L may pass through the lens module 20 and may reach an imaging plane of the image sensor 11. The camera module 1 may include an AF driver 23 which may move the lens module 20 in an optical axis direction to adjust a focal length. The AF driver 23 may include, for example, a coil and a magnet opposing each other. The coil may be fixedly coupled to the lens module 20, the magnet may be coupled to a fixed body such as a housing, and electromagnetic interaction between the coil and the magnet may allow the lens module 20 to move in the optical axis direction.

In an example embodiment, the camera module 1 may provide an optical image stabilization (hereinafter, "OIS") function. The camera module 1 may provide an OIS function by driving the image sensor 11. For example, the camera module 1 may include an OIS driver 12 configured to move the image sensor 11 in a direction orthogonal to the optical axis, or to rotate the image sensor 11 about an axis parallel to the optical axis and/or to rotate about an axis orthogonal to the optical axis.

In an example embodiment, the camera module 1 may include a sensor shifting module 10. The sensor shifting module 10 may include components necessary to implement the OIS function by driving the image sensor 11. For example, the sensor shifting module 10 may include the image sensor 11 and the OIS driver 12 for driving the image sensor 11. As another example, the sensor shifting module 10 may refer to only the OIS driver 12 excluding the image sensor 11.

In an example embodiment, the camera module 1 may further include an optical element in addition to the lens module 20 and the image sensor 11. In an example embodiment, the camera module 1 may include two or more lens modules. For example, the first optical element 30 and/or the second optical element 40 may be a lens module distinct from the lens module 20.

In an example embodiment, the camera module 1 may include an optical path changing element disposed in front of the lens module 20. For example, the first optical element 30 may be implemented as a prism or a mirror. In another example embodiment, the optical path changing element may be disposed between the image sensor 11 and the lens module 20. For example, the second optical element 40 may be implemented as a prism or a mirror.

Hereinafter, the sensor shifting module 100 described with reference to FIGS. 2A to 9B may be applied to the camera module 1 in FIG. 1.

2. Sensor Shift 2.1. Translational OIS

Figure 2A:
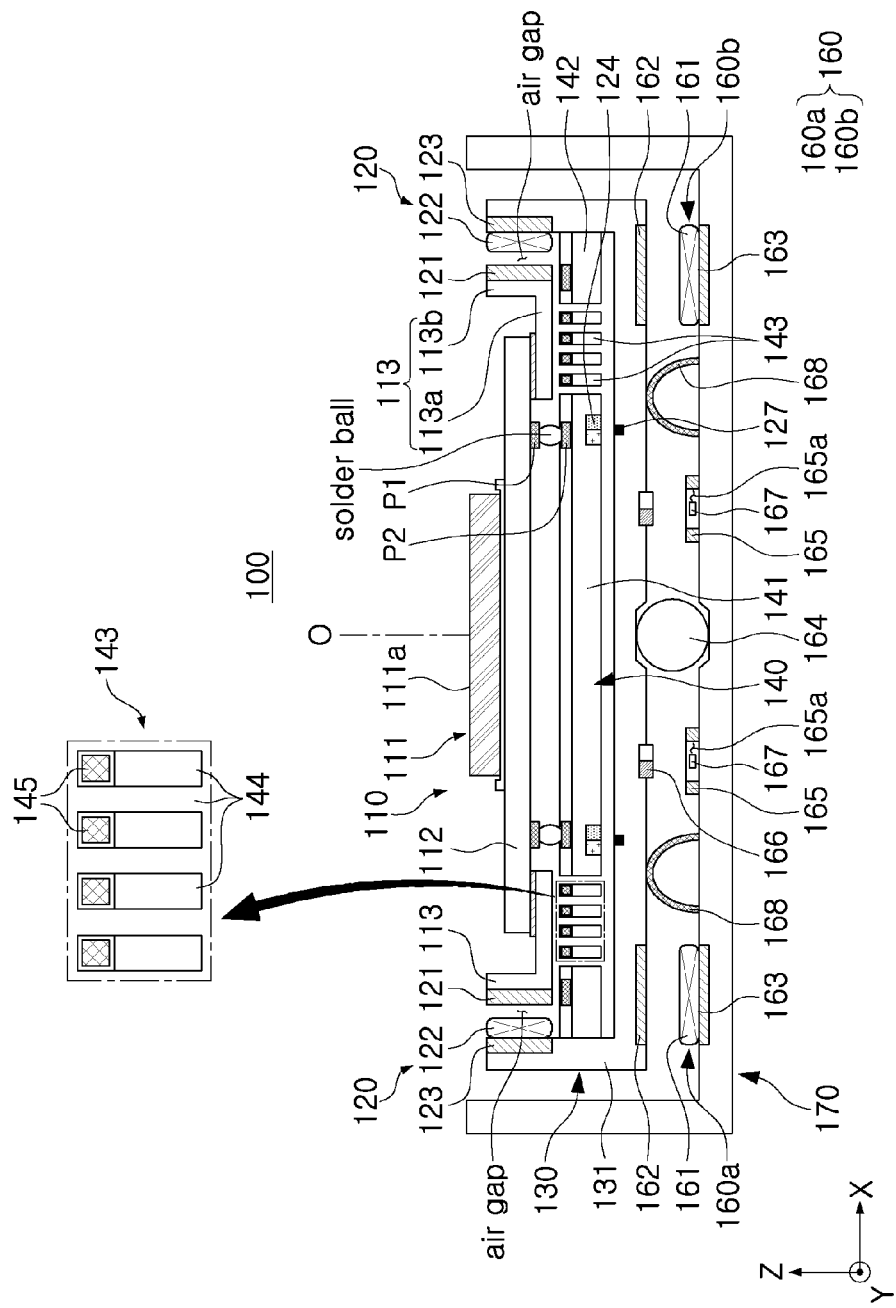
FIGS. 2A, 2B, and 2C are diagrams illustrating a sensor shifting module according to an example embodiment of the present disclosure.
Figure 2B:
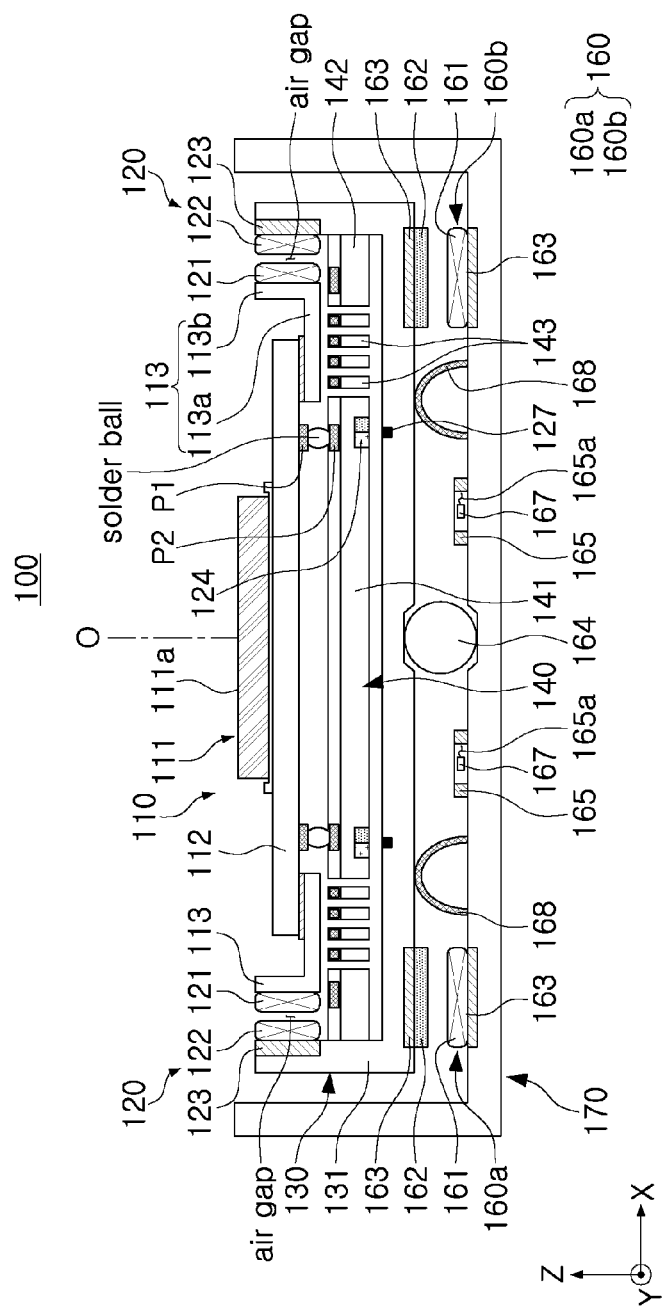
Figure 2C:
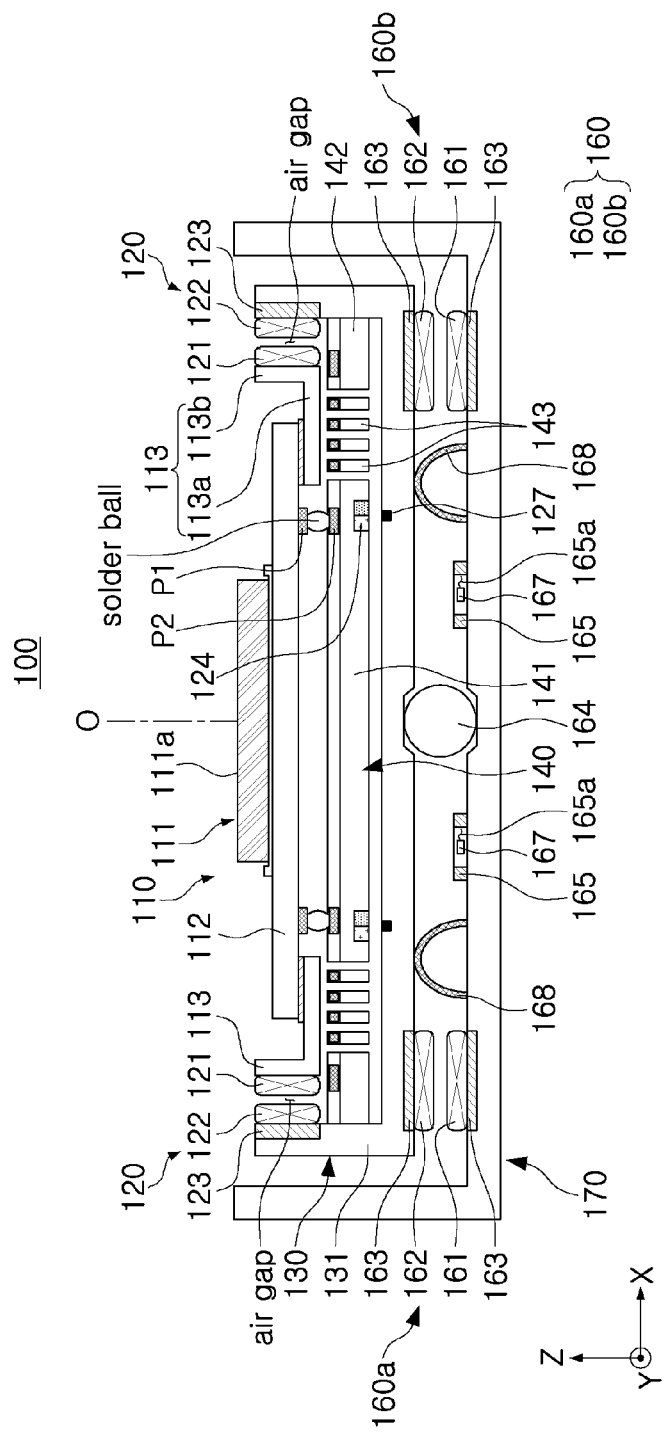

FIGS. 2A to 2C are diagrams illustrating a sensor shifting module 100 according to an example embodiment. The sensor shifting module 100 may include an OIS driver. The OIS driver may include at least one of a first OIS driver 120 and a second OIS driver 160 to be described later. For example, the OIS driver 12 of the camera module 1 in FIG. 1 may include at least one of the first OIS driver 120 and the second OIS driver 160.

2.1.1. Structure

The sensor shifting module 100 may include a first OIS driver 120 for driving the image sensor 111. In an example embodiment, the first OIS driver 120 may include a second movable body 110 including an image sensor 111 and a first movable body 130. The second movable body 110 may be movably disposed in the first movable body 130. The second movable body 110 may be configured to move together with the image sensor 111. For example, the second movable body 110 may include a sensor substrate 112 on which the image sensor 111 is mounted and a sensor holder 113 coupled to the sensor substrate 112.

Referring to FIGS. 2A to 2C, the sensor holder 113 may include a plate 113a connected to the lower portion of the sensor substrate 112, and an extension portion 113b extending upwardly from the edge of the plate 113a (that is, in the +Z direction). The extension portion 113b may oppose a driving coil 122, and a driving yoke 121 may be seated on the extension portion 113b. In another example embodiment, the driving yoke 121 may be mounted on the first movable body 130 and the driving coil 122 may be mounted on the sensor holder 113. In this case, the driving coil 122 and/or the yoke 123 may be seated on the extension portion 113b.

The signal of the image sensor 111 may be transmitted to another electronic component (e.g., an image signal processor (ISP)) through the sensor substrate 112 and a connector.

The first movable body 130 may include a base 131 and components fixedly coupled to the base 131. For example, the first movable body 130 may include the driving coil 122 and the yoke 123 to be described in more detail later.

The second movable body 110 may move, through the first OIS driver 120, in a direction orthogonal to a direction in which the imaging plane 111a of the image sensor 111 is directed. In an example embodiment, the first OIS driver 120 may compensate for shaking of the camera module 1 or the electronic device on which the image sensor 111 is mounted in a direction orthogonal to the optical axis O. The first OIS driver 120 may move (translate) the image sensor 111 in a first direction and a second direction orthogonal to the optical axis O. The first direction and the second direction may intersect each other. For example, the first OIS driver 120 may move the second movable body 110 in the X-direction and/or the Y-direction orthogonal to the Z-axis, thereby correcting the shaking in the X-direction and/or the Y-direction.

In the example embodiments, the direction in which the imaging plane 111a of the image sensor 111 is directed may be referred to as an optical axis O direction. That is, the second movable body 110 may move in a direction orthogonal to the optical axis O with respect to the first movable body 130. In the drawings, the optical axis O may be parallel to the Z axis, and accordingly, the Z direction may refer to a direction parallel to the optical axis O. Also, the X-direction or the Y-direction may refer to a direction orthogonal to the optical axis O. For example, in the example embodiment, the configuration in which the second movable body 110 moves in the X-direction may indicate that the second movable body 110 may move in a direction orthogonal to the optical axis O. For another example, the configuration in which the driving yoke 121 and the driving coil 122 oppose each other in the X-direction may indicate that the driving yoke 121 and the driving coil 122 oppose each other in a direction orthogonal to the optical axis O. Also, the X-direction or the Y-direction may be an example of two directions orthogonal to the optical axis and intersecting each other, and in the example embodiment, the X-direction and the Y-direction may be configured as two directions orthogonal to the optical axis O and intersecting each other.

2.1.2. Actuator

Referring to FIGS. 2A to 2C, in an example embodiment, the first OIS driver 120 may include the driving coil 122 coupled to one of the second movable body 110 or the first movable body 130, and the driving yoke 121 coupled to the other of the second movable body 110 and the first movable body 130. For example, referring to FIG. 2A, in an example embodiment, the driving coil 122 and the driving yoke 121 may be coupled to the base 131 and the sensor holder 113, respectively. The driving yoke 121 and the driving coil 122 may oppose each other in a direction orthogonal to the optical axis O. Electromagnetic interaction between the driving yoke 121 and the driving coil 122 may allow the second movable body 110 to move in a direction orthogonal to the optical axis O with respect to the first movable body 130.

In an example embodiment, the first OIS driver 120 may further include a yoke 123 disposed on one side of the coil. The yoke 123 may allow the magnetic field generated in the coil to be concentrated in a direction toward the driving yoke 121. Since the yoke 123 is disposed on one side of the driving coil 122, the magnetic field generated by the driving coil 122 may be prevented from affecting other electronic components or the effect of the magnetic field on such other electronic components may be reduced.

In the example embodiments, the driving coil 122 and the driving yoke 121 may be coupled to the first movable body 130 and the second movable body 110, respectively, but in another example embodiment, the driving coil 122 and the driving yoke 121 may be coupled to the second movable body 110 and the first movable body 130, respectively. For example, the driving coil 122 and the driving yoke 121 may be coupled to the sensor holder 113 and the base 131, respectively.

An air gap may be formed between the driving coil 122 and the driving yoke 121. Alternatively, the space between the driving coil 122 and the driving yoke 121 may be an air gap. That is, no other member (e.g., a magnet, i.e., a permanent magnet) may be present between the driving coil 122 and the driving yoke 121. The driving coil 122 and the driving yoke 121 may directly oppose each other with an air gap therebetween.

FIGS. 2A to 2C illustrate the components of the first OIS driver 120, and an example embodiment thereof is not limited to the structure in FIGS. 2A to 2C. The first OIS driver 120 may include a voice coil motor (VCM) actuator. For example, the driving yoke 121 partially included in the first OIS driver 120 may be replaced with a magnet. The magnet may be disposed to oppose the driving coil 122 instead of the driving yoke 121, and electromagnetic interaction between the magnet and the driving coil 122 may allow the second movable body 110 to move relative to the first movable body 130.

2.1.3. PCB Spring

In an example embodiment, the sensor shifting module 100 may include a substrate 140 mechanically connecting the second movable body 110 to the first movable body 130. The substrate 140 may couple the second movable body 110 to the first movable body 130 such that the second movable body 110 may move in a direction orthogonal to the optical axis with respect to the first movable body 130. A portion of the substrate 140 may be deformed according to the movement of the second movable body 110 with respect to the first movable body 130. That is, a portion of the substrate 140 may be flexible. When the substrate 140 is deformed, a restoring force may be created in the substrate 140, and the restoring force may allow the second movable body 110 to return to the original position thereof. The second movable body 110 in the equilibrium state may move relative to the first movable body 130 as a current is applied to the driving coil 122, and when the current does not flow in the driving coil 122, the second movable body 110 may return to the original position by the substrate 140.

Figure 3:
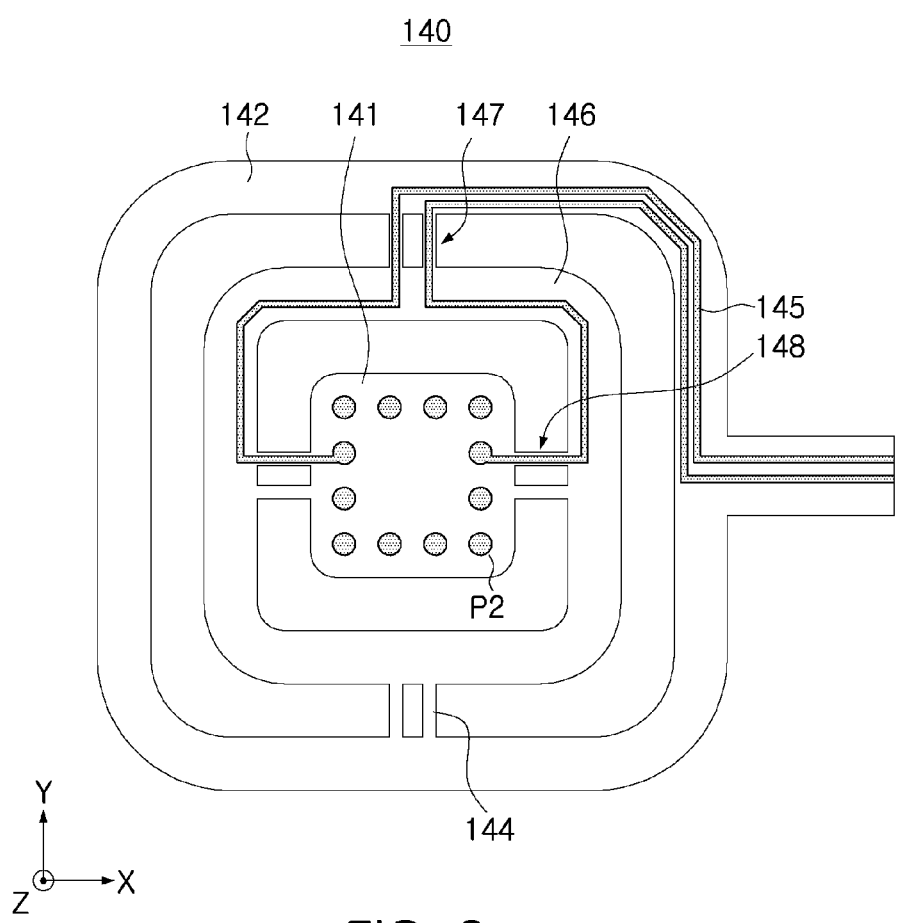
FIG. 3 is a diagram illustrating a substrate on which an image sensor is mounted according to an example embodiment of the present disclosure, viewed from above.

FIG. 3 is a diagram illustrating a substrate 140 on which an image sensor 111 is mounted according to an example embodiment, viewed from above. Referring to FIGS. 2A to 2C and 3, the substrate 140 may include a movable portion 141 (floating portion) on which the sensor substrate 112 is seated, and a fixed portion 142 fixed on the first movable body 130 (fixed portion). The sensor substrate 112 and the movable portion 141 may be electrically connected to each other through solder balls at the corresponding contact points P1 and P2.

While the second movable body 110 (or the image sensor 111) moves relative to the first movable body 130, the movable portion 141 may move relative to the fixed portion 142. The substrate 140 may include a supporting portion 143 connecting the movable portion 141 to the fixed portion 142. At least a portion of the supporting portion 143 may be deformed according to a relative movement between the movable portion 141 and the first movable body 130. For example, the supporting portion 143 may be configured as a flexible substrate. The flexible substrate may be provided in a form in which a conductive pattern (or an electrical trace 145) is formed in a film formed of a polyimide material.

In an example embodiment, the substrate 140 may include a plurality of bridge elements 144 connecting between the movable portion 141 to the fixed portion 142. The plurality of bridge elements 144 may be included in at least a portion of the supporting portion 143. The plurality of bridge elements 144 may be formed of a flexible material, such that the supporting portion 143 may be deformed when the movable portion 141 moves relative to the fixed portion 142. When the second movable body 110 moves relative to the first movable body 130, the movable portion 141 may move relative to the fixed portion 142, and the bridge elements 144 may be deformed. A restoring force generated as the bridge elements 144 are deformed may allow the second movable body 110 or the movable portion 141 to return to the original position. Each of the plurality of bridge elements 144 may include at least one electrical wiring 145 (electrical trace 145). That is, the plurality of bridge elements 144 may mechanically and electrically connect the movable portion 141 (or the second movable body 110) to the fixed portion 142 (or the first movable body 130). That is, the bridge elements 144 may support the image sensor 111 and may function as a path for transmitting a signal of the image sensor 111.

In an example embodiment, the substrate 140 may include a guide 146 disposed between the movable portion 141 and the fixed portion 142. For example, the guide 146 may be provided in the form of a picture frame surrounding the movable portion 141. The fixed portion 142, the guide 146, and the movable portion 141 may be connected to each other via bridge elements 144. For example, the substrate 140 may include a first bridge 147 extending from the movable portion 141 to the guide 146 and a second bridge 148 extending from the guide 146 to the fixed portion 142. The first bridge 147 and the second bridge 148 may extend in a direction orthogonal to the optical axis. The first bridge 147 and the second bridge 148 may extend in a direction in which the first bridge 147 and the second bridge 148 intersect each other. For example, the first bridge 147 may extend in the Y-direction, and the second bridge 148 may extend in the Z direction.

Each of the first bridge 147 and the second bridge 148 may include one or more bridge elements 144. In FIG. 3, the first bridge 147 may include four bridge elements 144 extending in the X-direction, and the second bridge 148 may include four bridge elements 144 extending in the Y-direction. The substrate 140 in FIG. 3 may be an example, and the forms of the supporting portion 143 connecting the movable portion 141 to the fixed portion 142 may be varied. For example, the supporting portion 143 may include a plurality of bridge elements 144 extending directly from the movable portion 141 to the fixed portion 142. As another example, the first bridge 147 or the second bridge 148 may include five bridge elements 144. The number of bridge elements 144 included in the first bridge 147 or the second bridge 148 may correspond to the number of the terminals of the image sensor 111.

The substrate 140 may include an electrical wiring 145 for transmitting a signal of the image sensor 111. A plurality of bridge elements 144 included in the supporting portion 143 may embed the electrical wiring 145 therein. The image sensor 111 may be mounted on the sensor substrate 112, and the sensor substrate 112 may be electrically connected to the fixed portion 142 of the substrate 140. An electrical wiring 145 may extend from each of the contact points P2 formed in the movable portion 141. The electrical wiring 145 may extend to the fixed portion 142 through the bridge element 144. The electrical wiring 145 extending to the fixed portion may be electrically connected to another substrate or electronic component.

FIG. 3 illustrates the electrical wiring 145 formed on the substrate 140, and only the electrical wiring 145 extending from a portion of the contact points is illustrated for ease of description.

2.1.4. Position Sensor

Referring to FIGS. 2A to 2C, in an example embodiment, the first OIS driver 120 may include a position sensor 127 which may measure how much the second movable body 110 moves in a direction orthogonal to the optical axis O.

The position sensor 127 may be configured as a Hall sensor or a magnetoresistance sensor.

The first OIS driver 120 may include a sensing magnet 124 moving together with the second movable body 110 and opposing the position sensor 127. The position sensor 127 may be disposed to oppose the sensing magnet 124. For example, the position sensor 127 may be disposed on the base 131, and the sensing magnet 124 may be disposed on the substrate 140 to oppose the position sensor 127 in the optical axis direction (in the Z direction). As another example, the position sensor 127 may be disposed on the substrate 140, and the sensing magnet 124 may be disposed on the base 131. Two or more of each of the position sensor 127 and the sensing magnet 124 may be provided in pairs.

2.1.5. Translational Arrangement

Figure 4:
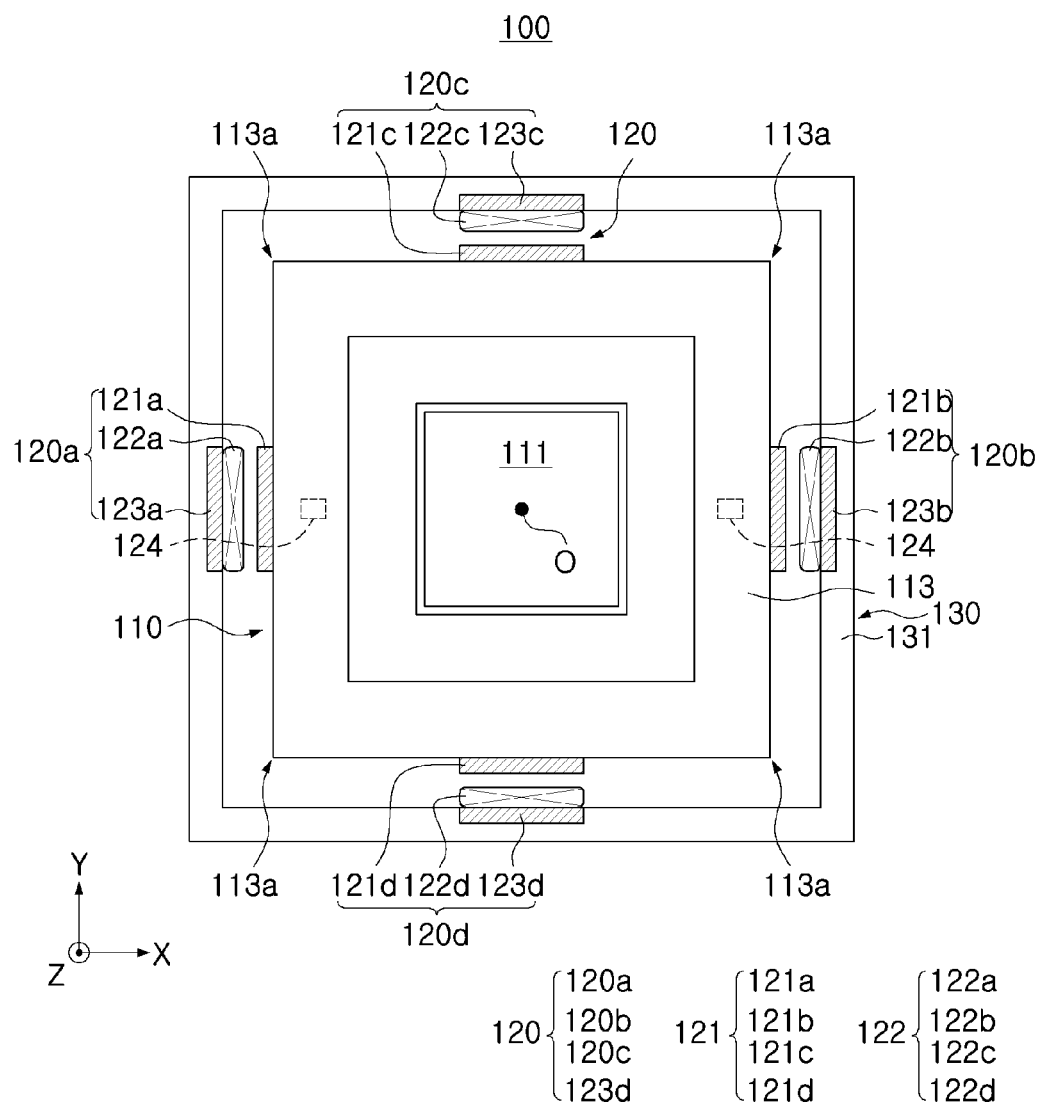
FIG. 4 is a diagram illustrating an OIS driver according to an example embodiment of the present disclosure, viewed from the above.

FIG. 4 is a diagram illustrating an OIS driver 120 according to an example embodiment, viewed from above.

The first OIS driver 120 may include a plurality of unit drivers 120a, 120b, 120c, and 120d. The unit drivers 120a, 120b, 120c, and 120d may each include a driving yoke 121 and a driving coil 122 opposing each other. The unit drivers 120a, 120b, 120c, and 120d may further each include a yoke 123 disposed on one side of the driving coil 122. For example, the first unit driver 120a may include a first driving yoke 121a, a first driving coil 122a, and a first yoke 123a.

Since only attractive force may be created between the driving coil 122 and the driving yoke 121, at least two unit drivers may be required to move back and forth the second movable body 110 in one direction.

Referring to FIG. 4, the first OIS driver 120 may include a first unit driver 120a disposed in the −X-direction of the second movable body 110, and a second unit driver 120b disposed in the +X-direction of the body 110 to compensate for shaking in the X-direction. The first unit driver 121a may include a first driving yoke 121a coupled to the second movable body 110, and a first driving coil 122a coupled to the base 131. The first unit driver 120a may further include a first yoke 123a disposed on one side of the first driving coil 122a. The second unit driver 120b may include a second driving yoke 121b coupled to the second movable body 110, and a second driving coil 122b coupled to the base 131. The second unit driver 120b may further include a second yoke 123b disposed on one side of the second driving coil 122b.

Referring to FIG. 4, the first OIS driver 120 may include a third unit driver 120c disposed in the +Y-direction of the second movable body 110, and a fourth unit driver 120d disposed in the −Y-direction of the second movable body 110 to compensate for the shaking in the Y-direction. The third unit driver 120c may include a third driving yoke 121c coupled to the second movable body 110, and a third driving coil 122c coupled to the base 131. The third unit driver 120c may further include a third yoke 123c disposed on one side of the third driving coil 122c. The fourth unit driver 120d may include a fourth driving yoke 121d coupled to the second movable body 110, and a fourth driving coil 122d coupled to the base 131. The fourth unit driver 120d may further include a fourth yoke 123d disposed on one side of the fourth driving coil 122d.

2.1.6. Translation

FIGS. 5A to 5D are diagrams illustrating movement of a movable body due to the OIS driver in FIG. 4.

Figure 5A:
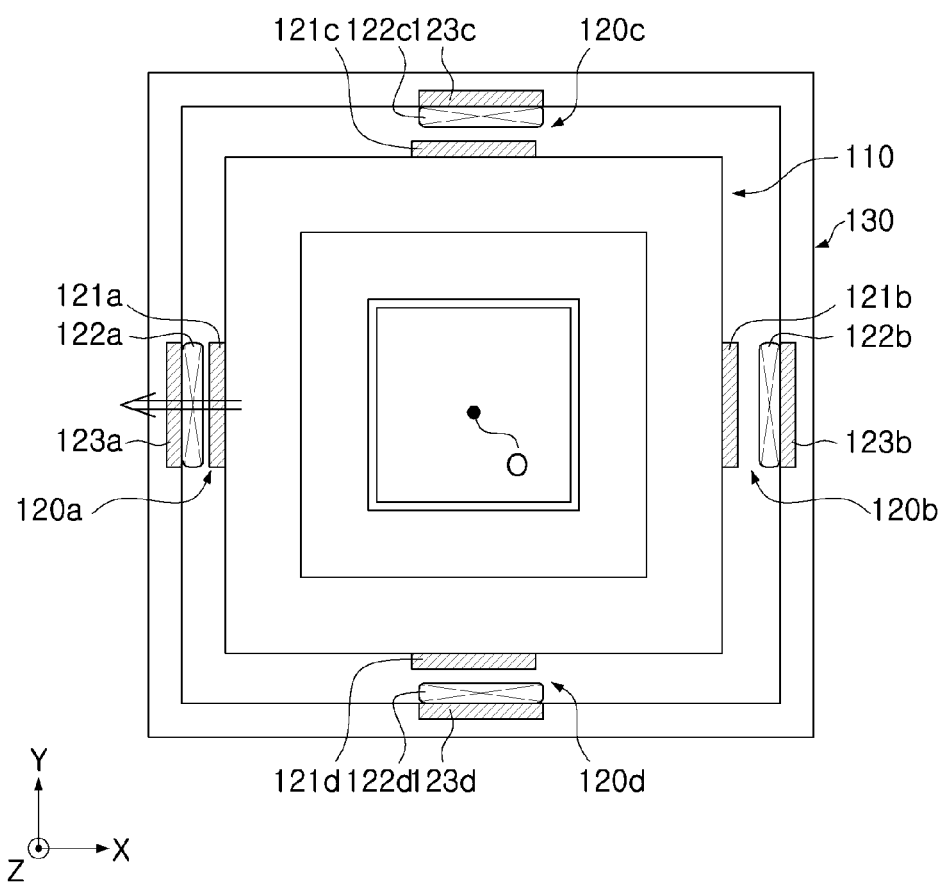
FIGS. 5A, 5B, 5C, and 5D are diagrams illustrating movement of a movable body due to the OIS driver in FIG. 4.
Figure 5B:
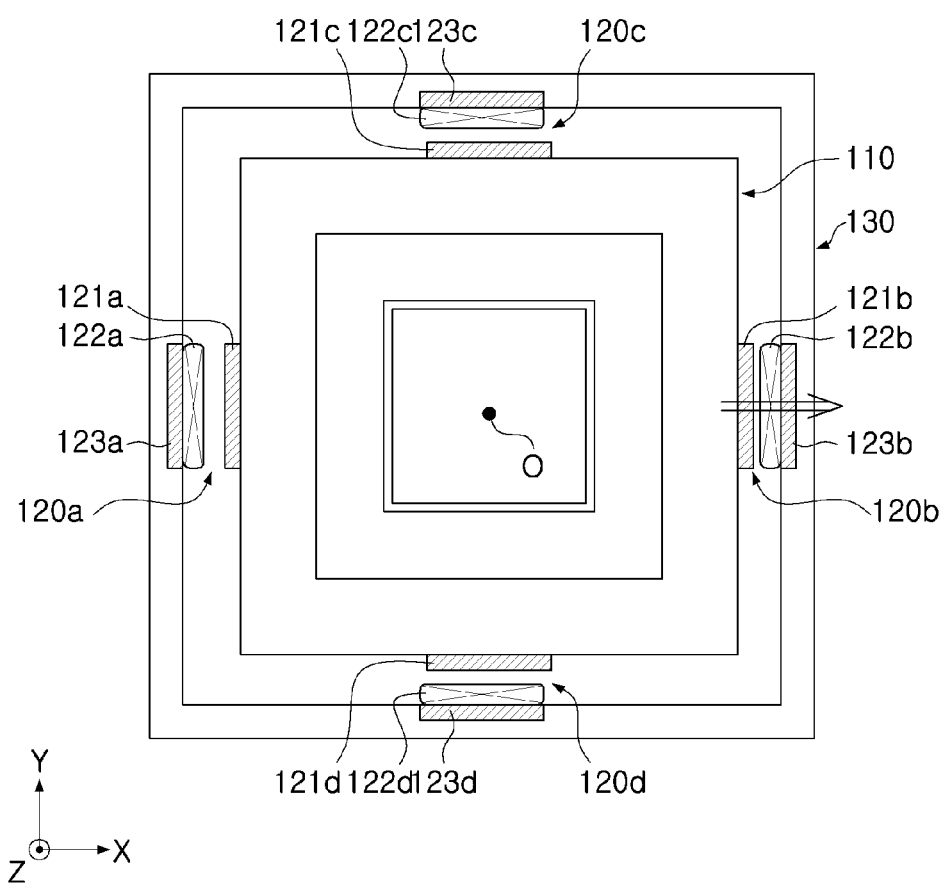
Figure 5C:
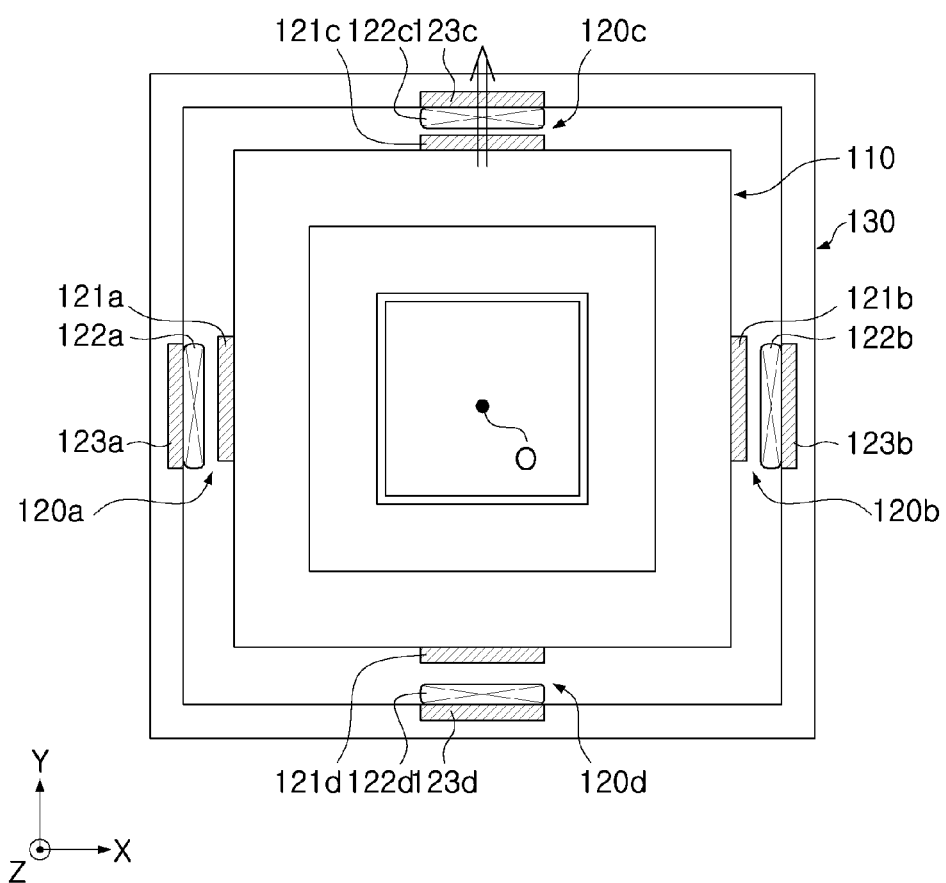
Figure 5D:
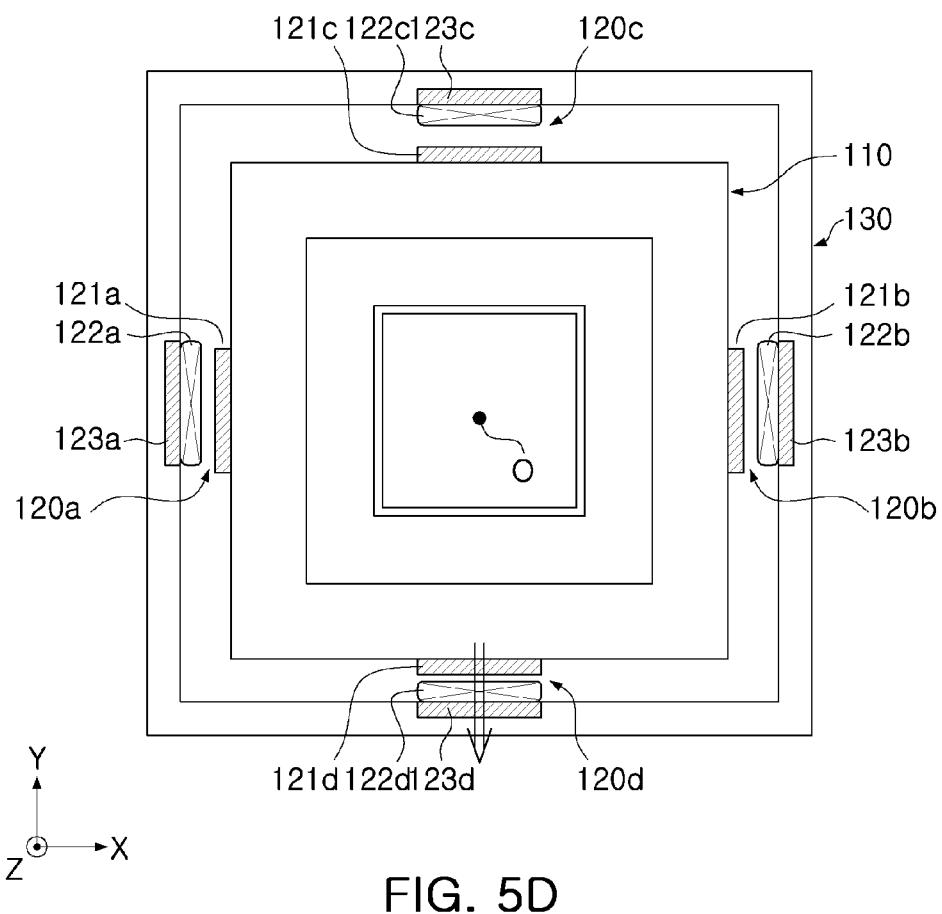

Referring to FIG. 5A, a current may be applied to the first driving coil 122a such that the first driving coil 122a may pull the first driving yoke 121a in the direction of an arrow, and accordingly, the second movable body 110 may move in the −X-direction. Referring to FIG. 5B, a current may be applied to the second driving coil 122b such that the second driving coil 122b may pull the second driving yoke 121b in the direction of the arrow, and accordingly, the second movable body 110 may move in +X-direction. Referring to FIG. 5C, a current may be applied to the third driving coil 122c such that the third driving coil 122c may pull the third driving yoke 121c in the direction of the arrow, and accordingly, the second movable body 110 may move in +Y-direction. Referring to FIG. 5D, a current may be applied to the fourth driving coil 122d such that the fourth driving coil 122d may pull the fourth driving yoke 121d in the direction of an arrow, and accordingly, the second movable body 110 may move in −Y-direction.

2.2. Tilting OIS 2.2.1. Tilting Structure

FIG. 2D illustrates a bottom surface of the fixed body 170 and a lower surface of the first movable body 130 in an example embodiment. Referring to FIGS. 2A to 2D, the sensor shifting module 100 may include a second OIS driver 160. The sensor shifting module 100 may include a second OIS driver 160 for moving the first movable body 130 relative to the fixed body 170. The second OIS driver 160 may rotate the first movable body 130 with respect to the fixed body 170 based on an axis orthogonal to the optical axis O. The shaking correction may be implemented by translating the image sensor 111 in a direction orthogonal to the optical axis O, but since the size of the mobile camera is relatively small, the range of the translation may also be relatively small and, accordingly, when the degree of shaking is large, the amount of correction may not reach the degree of shaking. The second OIS driver 160 may correct shaking by tilting the image sensor 111, and may provide a shaking correction function of excellent quality even for the relatively large degree of shaking.

Meanwhile, in the example embodiment, the sensor shifting module 100 may include both the first OIS driver 120 and the second OIS driver 160, but an example embodiment thereof is not limited thereto, and the sensor shifting module 100 may include only one of the first OIS driver 120 and the second OIS driver 160.

The first movable body 130 may be movably disposed in the fixed body 170. The first movable body 130 may move relative to the fixed body 170 by the second OIS driver 160. The image sensor 111 may be coupled to the first movable body 130. The image sensor 111 may be movably coupled to the first movable body 130. For example, the image sensor 111 may be coupled to the second movable body 110, and the second movable body 110 may be movably coupled to the first movable body 130.

2.2.2. Tilt Actuator

The second OIS driver 160 may include at least one tilt actuator disposed between the fixed body 170 and the first movable body 130. The tilt actuator may include a first driving element 161 disposed on the fixed body 170 and a second driving element 162 disposed on the first movable body 130. The first movable body 130 may rotate relative to the fixed body 170 by electromagnetic interaction between the first driving element 161 and the second driving element 162. In an example embodiment, one of the first driving element 161 and the second driving element 162 may be a coil, and the other may be a coil, a magnet, or a yoke. When no magnet is present in the first driving element 161 and the second driving element 162, there may be no magnetic field formed by the second OIS driver 160 unless a current is applied to the second OIS driver 160, such that the effect of the OIS driver 160 on the surrounding electronic components may be reduced.

For example, referring to FIG. 2A, in an example embodiment, the first driving element 161 may be a coil, and the second driving element 162 may be a yoke. When a current flows through the coil, reluctance force may be created between the coil and the yoke, which may tilt the first movable body 130.

For another example, referring to FIG. 2B, in an example embodiment, the first driving element 161 may be a coil and the second driving element 162 may be a magnet. When a current flows through the coil, an attractive force or repulsive force may be created between the coil and the magnet, which may tilt the first movable body 130.

As another example, referring to FIG. 2C, in an example embodiment, both the first driving element 161 and the second driving element 162 may be coils. When a current flows through the two coils, the two coils may become electromagnets, and magnetic attraction or repulsive force may be created between the two coils.

In an example embodiment, the tilt actuator may further include a yoke 163. The yoke 163 may be disposed on one side of the first driving element 161 and/or the second driving element 162. The yoke 163 may concentrate the magnetic field created by the coil or magnet to the opposite side. Also, the yoke 163 may prevent the magnetic field caused by the coil or magnet from affecting the other electronic components or may reduce the effect of the magnetic field on the other electronic components. For example, referring to FIG. 2A, the first driving element 161 may be a coil, and the yoke 163 may be disposed below the coil. The yoke 163 may allow a magnetic field arising when a current flows in the coil to be concentrated in the +Z direction (or the direction toward the second driving element 162). For another example, referring to FIG. 2B, the first driving element 161 may be a coil and the second driving element 162 may be a magnet, and the yoke 163 may be disposed below the first driving element 161 and above the second driving element 162. As another example, referring to FIG. 2C, both the first driving element 161 and the second driving element 162 may be coils, and the yoke 163 may be disposed on an external side of each of the two driving elements 161 and 162.

2.2.3. Tilt Ball Guide

In an example embodiment, the second OIS driver 160 may include a tilt guide ball 164 disposed between the fixed body 170 and the first movable body 130. The tilt guide ball 164 may provide a tilt center for the fixed body 170 of the first movable body 130. For example, the first movable body 130 may be tilted around the tilt guide ball 164. The lower surface of the first movable body 130 and the bottom surface of the fixed body 170 may oppose each other in the optical axis O direction, and a groove for partially accommodating the tilt guide ball 164 may be formed in each of the lower surface of the first movable body 130 and the bottom surface of the fixed body 170.

2.2.4. Tilt Pulling

In an example embodiment, the second OIS driver 160 may include a first magnetic member 165 disposed on the fixed body 170 and a second magnetic member 166 disposed on the first movable body 130, and opposing each other in a direction parallel to the optical axis O. A magnetic attraction may be created between the first magnetic member 165 and the second magnetic member 166, which may pull the first movable body 130 to the bottom surface of the fixed body 170. Accordingly, the tilt guide ball 164 may maintain to be in contact with the first movable body 130 and the fixed body 170, such that the first movable body 130 may be smoothly tilted with respect to the fixed body 170.

One of the first magnetic member 165 and the second magnetic member 166 may be a magnet, and the other may be a magnet or a yoke. For example, referring to FIG. 2A, the first magnetic member 165 may be a yoke and the second magnetic member 166 may be a magnet.

2.2.5. Tilt Sensor

In an example embodiment, the second OIS driver 160 may include a position sensor 167 configured to measure the tilt amount of the first movable body 130. The position sensor 167 may be implemented as a Hall sensor or a magnetoresistance sensor, and in this case, the second OIS driver 160 may include a sensing magnet opposing the position sensor 167. In an example embodiment, one of the first magnetic member 165 and the second magnetic member 166 may be a magnet and the other may be a yoke, and the magnetic member, which is a magnet, may function as a sensing magnet. For example, referring to FIG. 2A, the second magnetic member 166 may be a magnet, the first magnetic member 165 may be a yoke, the first magnetic member 165 may include a through portion 165a therein, and the position sensor 167 may be disposed in the through portion 165a.

2.2.6. Leaf Spring

In an example embodiment, the second OIS driver 160 may include an elastic member 168 which may provide a restoring force to the first movable body 130 when the first movable body 130 is tilted. The elastic member 168 may be deformed according to the tilting of the first movable body 130 and may provide a restoring force to the first movable body 130 and may allow the first movable body 130 to return to the original position thereof. Referring to FIG. 2A, the elastic member 168 may be disposed between the first movable body 130 or the fixed body 170. In an example embodiment, the elastic member 168 may be provided in the form of a leaf spring bent to be curved toward the first movable body 130 or the fixed body 170. For example, referring to FIG. 2A, the elastic member 168 may have a curved shape, curved in the direction of the first movable body 130, and both ends of the elastic member 168 may be fixed to the bottom surface of the fixed body 170.

2.2.7. Arrangement

The second OIS driver 160 may include a plurality of tilt actuators (e.g., 160-1, 160-2, 160-3, 160-4). Referring to FIG. 2D, the four tilt actuators 160-1, 160-2, 160-3 and 160-4 may be disposed between the fixed body 170 and the first movable body 130. Each of the four tilt actuators 160-1, 160-2, 160-3 and 160-4 may include a first driving element 161 and a second driving element 162 opposing each other. Each of the plurality of tilt actuators 160-1, 160-2, 160-3, and 160-4 may generate attractive or repulsive force, and the direction and amount of rotation of the first movable body 130 may be determined by the sum of the moments provided by each of the plurality of tilt actuators 160-1, 160-2, 160-3, and 160-4 to the first movable body 130.

In an example embodiment, one or more sets of the first magnetic member 165 and the second magnetic member 166 may be disposed in positions spaced apart from the tilt guide ball 164. Referring to FIG. 2D, the first magnetic member 165 and the second magnetic member 166 may be disposed in four positions around the tilt guide ball 164. However, the arrangement of the first magnetic member 165 and the second magnetic member 166 illustrated in FIG. 2D may be merely an example.

2.2.8. Tilting Movement

Figure 6:
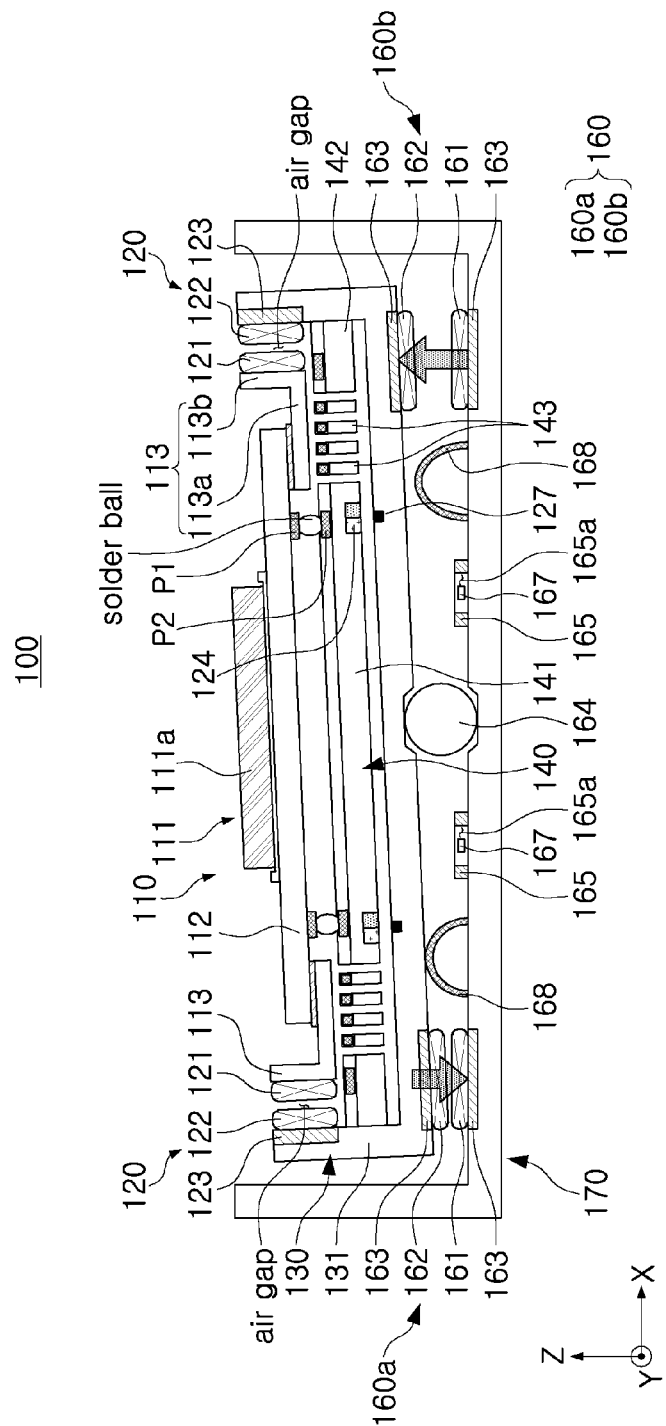
FIGS. 6 and 7 are diagrams illustrating tilting of a first movable body.
Figure 7:
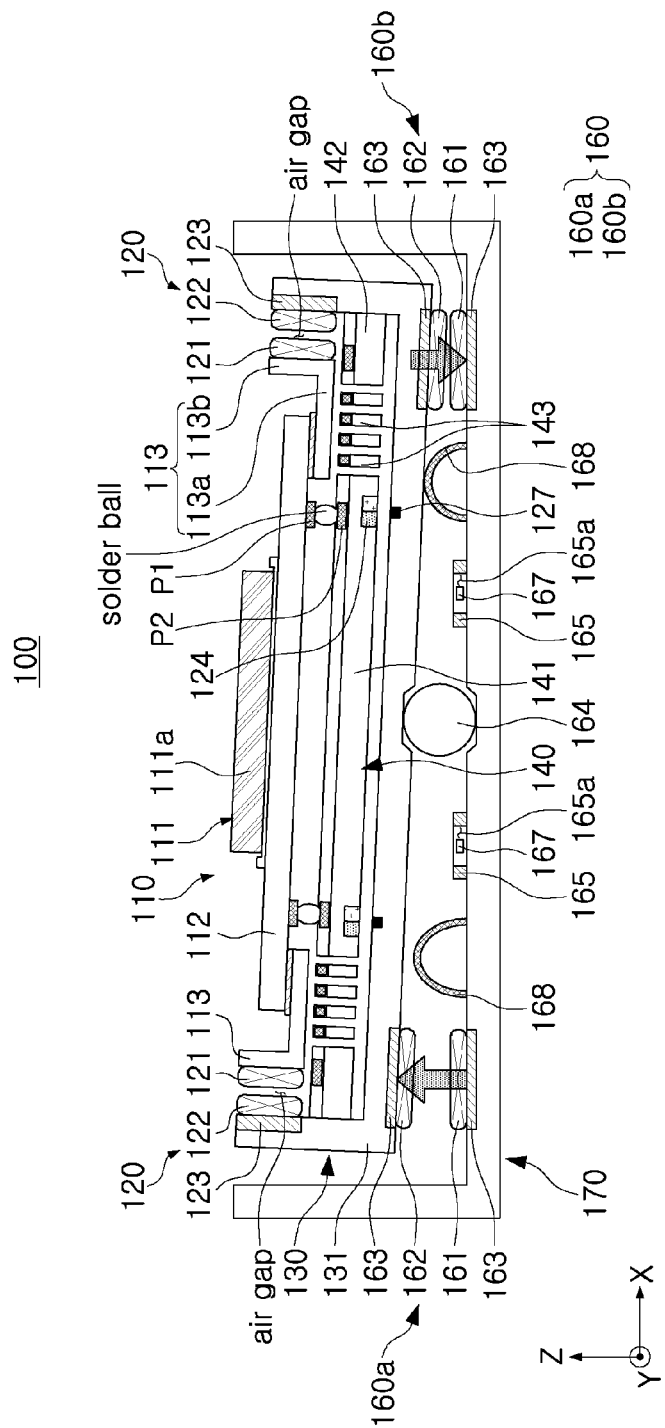

FIGS. 6 and 7 are diagrams illustrating tilting of a first movable body 130.

Referring to FIGS. 6 and 7, the first driver may include a first tilt actuator 160*a* disposed on one side and a second tilt actuator 160*b* disposed on the other side with respect to a tilting center (or the tilt guide ball 164). Each of the first tilt actuator 160*a* and the second tilt actuator 160*b* may include at least one coil, and when a current flows through the coil, a moment in the Y-direction may be provided to the first movable body 130.

Referring to FIG. 6, by controlling the current flowing in the coil, an attractive force may be created between the driving elements 161 and 162 included in the first tilt actuator 160*a*, and a repulsive force may be created between the driving elements 161 and 162 included in the second tilting actuator 160*b*, such that the first movable body 130 may rotate in a counterclockwise direction. As the first movable body 130 is tilted in a counterclockwise direction, the elastic member 168 adjacent to the first tilt actuator 160*a* may be deformed such that a clockwise moment may be provided to the first movable body 130.

Referring to FIG. 7, by controlling the current flowing in the coil, a repulsive force may be created between the driving elements 161 and 162 included in the first tilt actuator 160*a*, and an attractive force may be created between the driving elements 161 and 162 included in the second tilting actuator 160*b*, such that the first movable body 130 may rotate in a clockwise direction. As the first movable body 130 is tilted in a clockwise direction, the elastic member 168 adjacent to the second tilt actuator 160*b* may be deformed such that a moment in a counterclockwise direction may be provided to the first movable body 130.

When the driving elements 161 and 162 included in the first tilt actuator 160*a* or the second tilt actuator 160*b* are a coil and a yoke, only an attractive force may be created between the driving elements 161 and 162, and no repulsive force may be created. In this case, only the attractive force created between the driving elements 161 and 162 may tilt the first movable body 130.

FIGS. 6 and 7 illustrate examples of tilting of the first movable body 130, illustrating the rotation of the first movable body 130 about the Y-axis direction. The first driver may include three or more tilt actuators, and by a combination thereof, the first movable body 130 may rotate about several axes orthogonal to the optical axis O.

2.3. Reluctance
2.3.1. Translation Driver

In an example embodiment, the first OIS driver 120 may not include a permanent magnet. In an example embodiment, when no current flows in the driving coil 122, the magnetic field caused by the driving yoke 121 may be zero or may have a relatively small level. Accordingly, the magnetic field caused by the first OIS driver 120 may be prevented from affecting the other electronic components (e.g., the other electronic components in the camera module 1, or the electronic components in the other camera module 1) or the effect of the magnetic field on the other electronic components may be reduced.

In an example embodiment, the yoke (e.g., the members referred to as a yoke in the example embodiments, such as the driving yoke 121 and the yoke 123 in FIG. 2A) may be formed of a soft magnetic material. A soft magnetic material may have a small coercive force and may be magnetized when exposed to a magnetic field, but when the magnetic field disappears, a soft magnetic material may lose magnetism or may have a relatively low level of magnetism.

When a current is applied to the driving coil 122, the driving yoke 121 may be magnetized, such that reluctance force may be created between the driving coil 122 and the driving yoke 121. Attractive force may be created in a direction in which the driving yoke 121 and the driving coil 122 oppose each other, such that the second movable body 110 may move in the corresponding direction with respect to the first movable body 130. For example, referring to FIG. 4, when a current is applied to the first driving coil 122*a*, an attractive force may be created between the first driving coil 122*a* and the first driving yoke 121*a*, such that the second movable body 110 may move in the −X-direction. Conversely, when a current is applied to the second driving coil 122*b*, an attractive force may be created between the second driving coil 122*b* and the second driving yoke 121*b*, such that the second movable body 110 may move in the +X-direction.

2.3.2. Tilting Driver

In an example embodiment, the second OIS driver 160 may not include a permanent magnet. For example, one of the first driving element 161 or the second driving element 162 may be a coil and the other may be a coil or a yoke. When both the first driving element 161 and the second driving element 162 are coils, an attractive force or a repulsive force may be created between the first driving element 161 and the second driving element 162 according to the directions of currents flowing through the two coils. When the first driving element 161 is a coil and the second driving element 162 is a yoke, and a current flows in the coil, reluctance force may be created between the yoke and the coil.

In an example embodiment, when no current flows in the second OIS driver 160 (or the coil included in the second OIS driver 160), the magnetic field due to the second OIS driver 160 may be zero or may have a very small level. Accordingly, the magnetic field caused by the second OIS driver 160 may be prevented from affecting the other electronic components (e.g., the other electronic components in the camera module 1, or the electronic components in the other camera module 1) or the effect of the magnetic field on the other electronic components may be reduced.

2.4. Flexible Substrate Deformation

FIGS. 8A to 8D are diagrams illustrating deformation of a substrate 140 according to movement of a movable body 110.

Figure 8A:
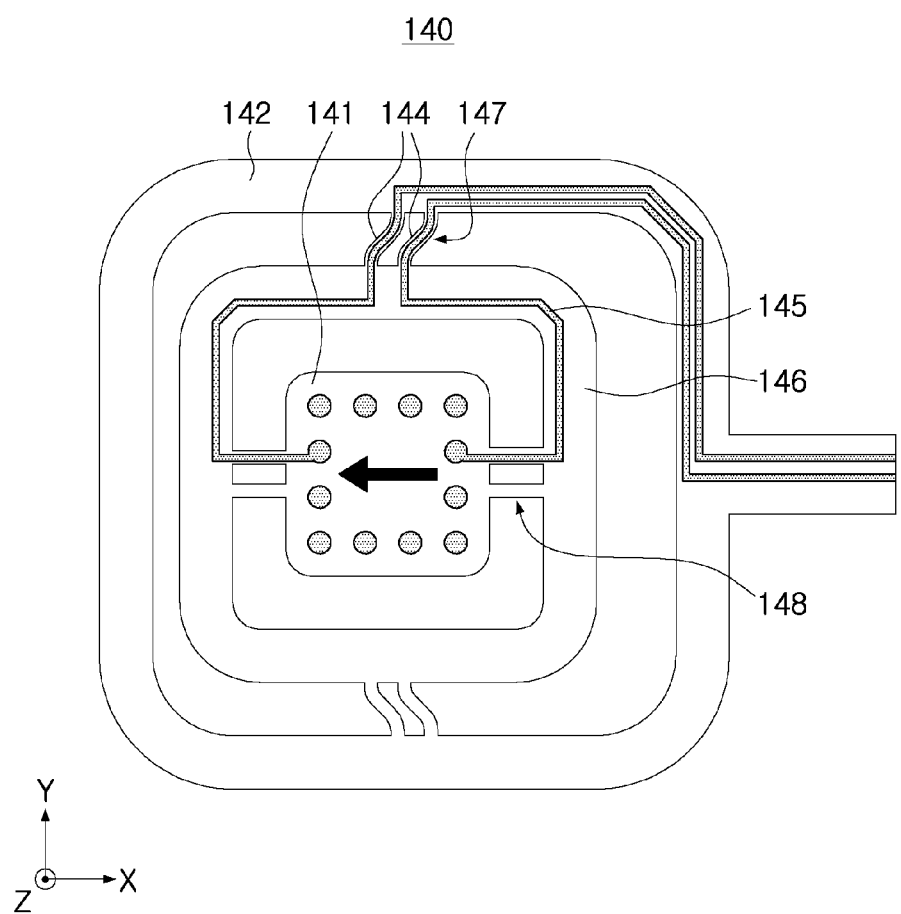
FIGS. 8A, 8B, 8C, and 8D are diagrams illustrating deformation of a substrate according to movement of a movable body.

Referring to FIG. 8A, when the second movable body 110 moves in the −X-direction, the movable portion 141 of the substrate 140 may also move in the −X-direction, and accordingly, the first bridge 147 connecting the guide 146 to the fixed portion 142 may be deformed. Since the bridge elements 144 included in the first bridge 147 have elasticity, the bridge 147 may provide a restoring force for returning the movable portion 141 in the direction opposite to the moving direction (the +X-direction). Accordingly, when no current is applied to the first OIS driver 120, the movable portion 141 may move in the +X-direction.

Figure 8B:
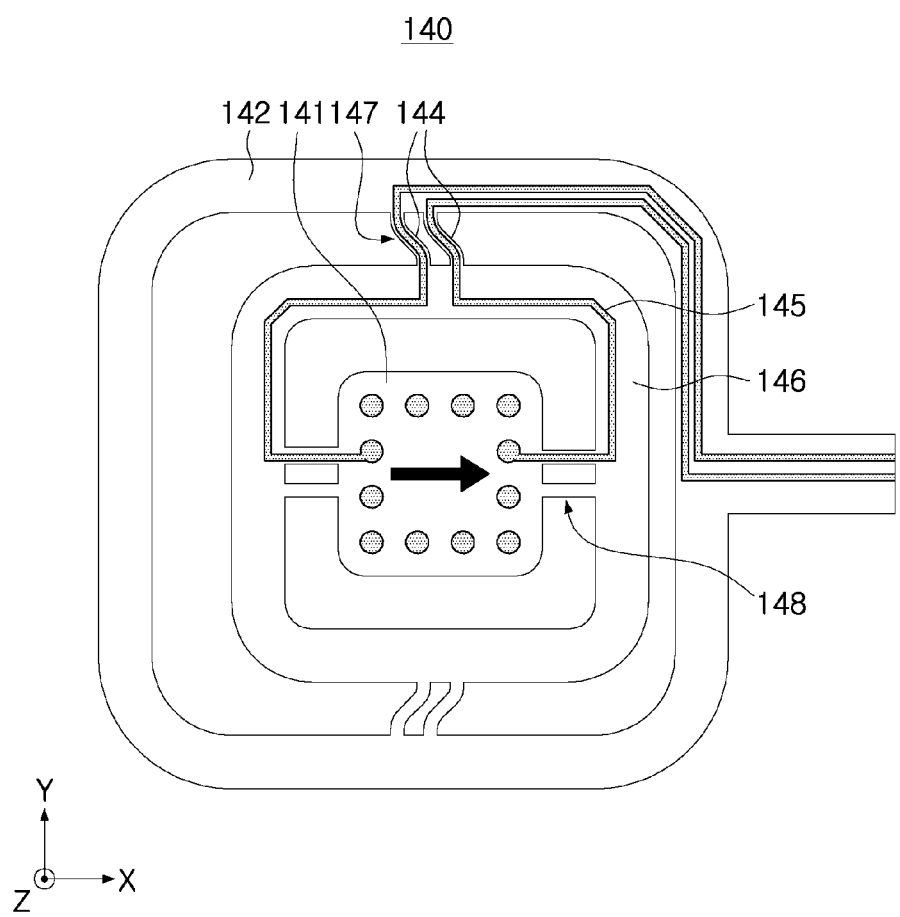

Referring to FIG. 8B, when the second movable body 110 moves in the +X-direction, the movable portion 141 of the substrate 140 may also move in the +X-direction, and accordingly, the first bridge 147 connecting the guide 146 to the fixed portion 142 may be deformed. Since the bridge elements 144 included in the first bridge 147 have elasticity, the deformed first bridge 147 may provide a restoring force to return the movable portion 141 in the direction opposite to the moving direction (the −X-direction).

Figure 8C:
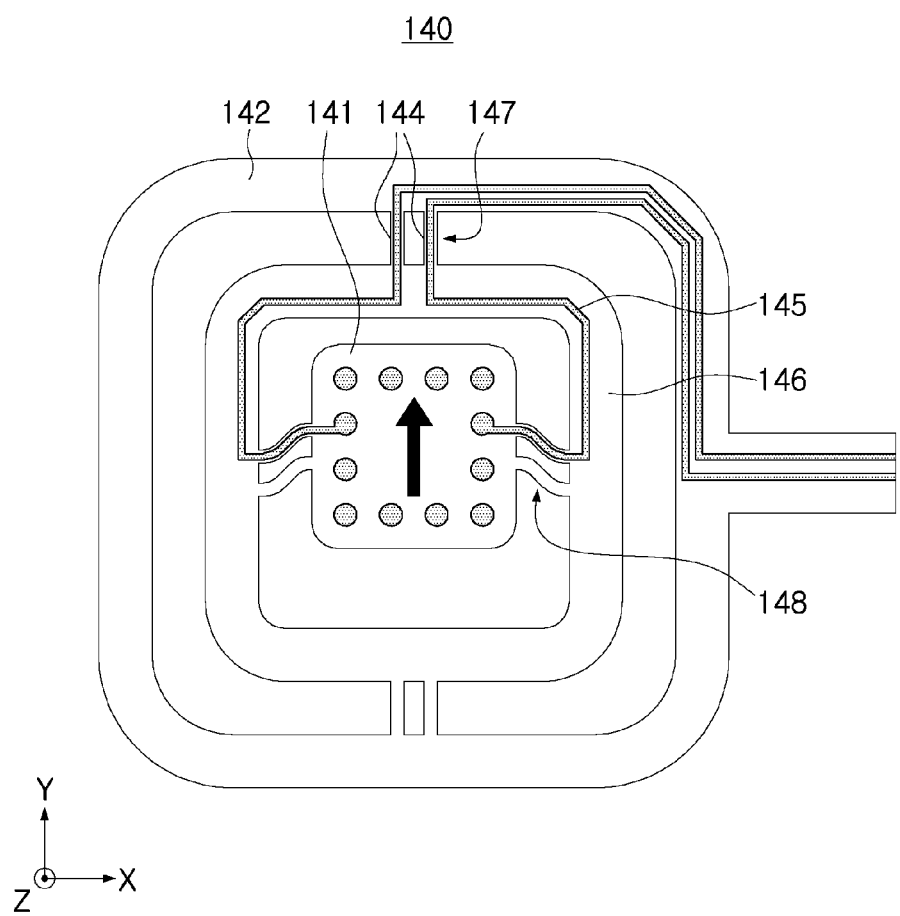

Referring to FIG. 8C, when the second movable body 110 moves in the +Y-direction, the movable portion 141 of the substrate 140 may also move in the +Y-direction, and accordingly, the second bridge 148 connecting the movable portion 141 to the guide 146 may be deformed. Since the bridge elements 144 included in the second bridge 148 have elasticity, the deformed second bridge 148 may provide a restoring force to return the movable portion 141 in the direction opposite to the moving direction (the −Y-direction).

Figure 8D:
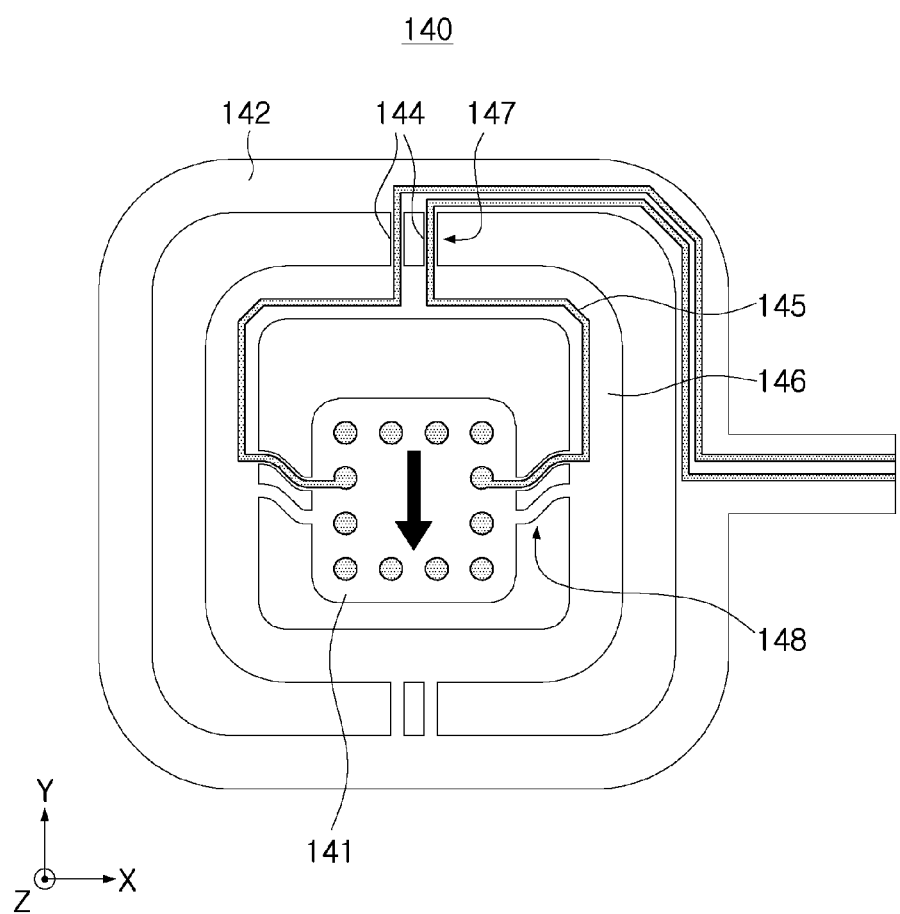

Referring to FIG. 8D, when the second movable body 110 moves in the −Y-direction, the movable portion 141 of the substrate 140 may also move in the −Y-direction, and accordingly, the second bridge 148 connecting the movable portion 141 to the guide 146 may be deformed. Since the bridge elements 144 included in the second bridge 148 have elasticity, the deformed second bridge 148 may provide a restoring force to return the movable portion 141 in the direction opposite to the moving direction (the +Y-direction).

2.5. Mover Deformation

Figure 9A:
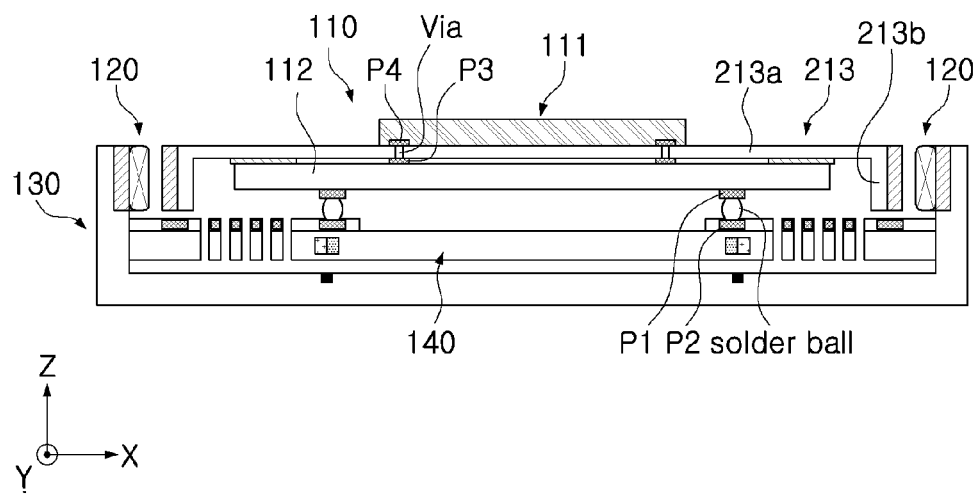
FIGS. 9A and 9B are diagrams illustrating a sensor holder having a form different from the example in FIG. 2A.
Figure 9B:
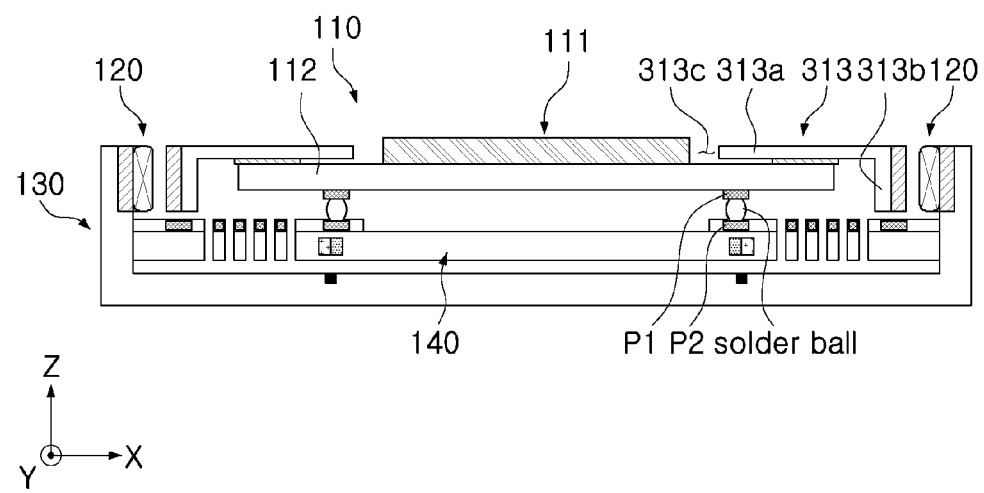

FIGS. 9A and 9B are diagrams illustrating a sensor holder 213, 313 having a form different from the example in FIG. 2A.

Referring to FIG. 9A, the sensor holder 213 may be disposed on the sensor substrate 112. In an example embodiment, the sensor holder 213 may include a plate 213*a* disposed on the sensor substrate 112 and an extension portion 213*b* extending downwardly (in the −Z direction) from the edge of the plate 213*a*. The extension portion 213*b* may oppose the driving coil (e.g., the driving coil 122 in FIG. 2A) of the first OIS driver 120, and the driving yoke (e.g., the driving yoke 121 in FIG. 2A) of the first OIS driver 120 may be seated on the extension portion 213*b*. In another example embodiment, the driving yoke may be mounted on the first movable body 130 and the driving coil may be mounted on the sensor holder 213, and in this case, the driving coil and/or the yoke (e.g., the yoke 123 in FIG. 2A) may be seated on the extension portion 213*b*. As compared to the sensor holder 113 in FIG. 2A, the sensor holder 213 in FIG. 9A may be more advantageous in avoiding interference with a solder ball connecting the sensor substrate 112 to the substrate 140. Also, when the sensor holder 213 is disposed on the upper side of the sensor substrate 112, the thickness of the sensor holder 213 may be relatively freely increased, which may improve mechanical rigidity of the sensor holder 213.

Referring to FIG. 9A, the image sensor 111 may be connected to the sensor substrate 112 at corresponding contact points P3 and P4 through a conductive via.

Referring to FIG. 9B, the sensor holder 313 may be disposed on the sensor substrate 112. In an example embodiment, the sensor holder 313 may include a plate 313*a* disposed on the sensor substrate 112 and an extension portion 313*b* extending downwardly (in the −Z direction) from the edge of the plate 313*a*. The extension portion 313*b* may oppose the driving coil (e.g., the driving coil 122 in FIG. 2A) of the first OIS driver 120, and the driving yoke (e.g., the driving yoke 121 in FIG. 2A) of the first OIS driver 120 may be seated on the extension portion 313*b*. In another example embodiment, the driving yoke may be mounted on the first movable body 130, and the driving coil may be mounted on the sensor holder 313, and in this case, the driving coil and/or the yoke (e.g., the yoke 123 in FIG. 2A) may be seated on the extension portion 313*b*. As compared to the sensor holder 113 in FIG. 2A, the sensor holder 313 in FIG. 9B may be more advantageous in avoiding interference with the solder ball connecting the sensor substrate 112 and the substrate 140. Also, when the sensor holder 313 is disposed on the upper side of the sensor substrate 112, the thickness of the sensor holder 313 may be relatively freely increased, which may improve mechanical rigidity of the sensor holder 313.

Referring to FIG. 9B, the image sensor 111 may be directly mounted on the sensor substrate 112. Accordingly, the sensor holder 313 may include a through portion 313*c* in a portion corresponding to the image sensor 111. The image sensor 111 may be seated on the sensor substrate 112, and a terminal of the image sensor 111 and a terminal of the sensor substrate 112 may be connected to each other through wire bonding.

According to the aforementioned example embodiments, the camera may provide effective optical image stabilization with low power. Also, according to an example embodiment, the effect of the magnetic field of the actuator driving the image sensor on the electronic component disposed outside the camera may be eliminated or reduced.

The AF driver 23, OIS drivers, first and second OIS drivers, OIS driver 12, 120, 160, first, second, third, and fourth unit drivers 120*a*, 120*b*, 120*c*, 120*d*, sensors, sensor shifting modules, sensor shifting modules 10, 100, image sensors, image sensors 11, 111, actuators, tilt actuators, first tilt actuators 160*a*, second tilt actuators, tilt actuators 160*b*, 160-1, 160-2, 160-3, and 160-4, position sensors, position sensors 127, 167, processors, memories, and other apparatuses, devices, units, modules, and components described herein with respect to FIGS. 1-9B are implemented by or representative of hardware components. Examples of hardware components that may be used to perform the operations described herein where appropriate include controllers, sensors, generators, drivers, memories, comparators, arithmetic logic units, adders, subtractors, multipliers, dividers, integrators, and any other electronic components configured to perform the operations described herein. In other examples, one or more of the hardware components that perform the operations described herein are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described herein. The hardware components may also access, manipulate, process, create, and store data in response to execution of the instructions or software. For simplicity, the singular term "processor" or "computer" may be used in the description of the examples described herein, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9B that perform the operations described herein are performed by computing hardware, for example, by one or more processors or computers, implemented as described above executing instructions or software to perform the operations described herein that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While specific example embodiments have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sensor shifting module, comprising:
   a fixed body;
   a first movable body movably disposed on the fixed body and coupled to an image sensor having an imaging plane oriented in a first direction; and
   a first driver configured to rotate the first movable body about an axis orthogonal to the first direction with respect to the fixed body,
   wherein the first driver comprises a tilt guide ball, disposed between the fixed body and the first movable body, and configured to provide a tilt center for the first movable body with respect to the fixed body, and
   wherein the first driver comprises an elastic member disposed between the fixed body and the first movable body.

2. The sensor shifting module of claim 1,
   wherein the first driver comprises a tilt actuator disposed between the fixed body and the first movable body, and the tilt actuator comprises a first driving element disposed on one of the first movable body and the fixed body, and a second driving element disposed on the other of the first movable body and the fixed body,
   wherein one of the first driving element and the second driving element is a coil, and the other is one of a coil, a magnet, and a yoke, and
   wherein the first movable body rotates by electromagnetic interaction between the first driving element and the second driving element.

3. The sensor shifting module of claim 2, wherein the first driver comprises a first magnetic member and a second magnetic member disposed on the fixed body and the first movable body, respectively, and opposing each other in the first direction.

4. The sensor shifting module of claim 3, wherein one of the first magnetic member and the second magnetic member is a magnet, the other is a yoke including a through portion therein, and the first driver comprises a position sensor disposed in the through portion.

5. The sensor shifting module of claim 1, wherein the elastic member is compressed according to a tilting of the first movable body.

6. The sensor shifting module of claim 5, wherein the elastic member is a leaf spring bent to be curved toward the fixed body or the first movable body.

7. The sensor shifting module of claim 1, further comprising:
a second movable body movably disposed on the first movable body and coupled to the image sensor; and
a second driver configured to move the second movable body in a direction orthogonal to the first direction with respect to the first movable body,
wherein the second driver comprises a driving coil coupled to one of the first movable body and the second movable body, and a driving yoke coupled to the other,
wherein the driving yoke opposes the driving coil in a direction orthogonal to the first direction, and
wherein, when a current is applied to the driving coil, the second movable body moves in a direction orthogonal to the first direction by electromagnetic interaction between the driving coil and the driving yoke.

8. The sensor shifting module of claim 7, wherein the driving yoke is a soft magnetic material.

9. The sensor shifting module of claim 7, wherein the second driver further comprises a yoke disposed on one side of the driving coil, and the driving coil is disposed between the driving yoke and the yoke.

10. The sensor shifting module of claim 7, further comprising:
a substrate mechanically connecting the second movable body to the first movable body and being deformed according to movement of the second movable body with respect to the first movable body.

11. The sensor shifting module of claim 10, wherein the substrate comprises electrical traces electrically connected to the image sensor.

12. The sensor shifting module of claim 11,
wherein the substrate comprises a movable portion fixedly coupled to the second movable body, a fixed portion fixedly coupled to the first movable body, and a supporting portion interconnecting the movable portion to the fixed portion, and
wherein the supporting portion comprises a plurality of bridges embedding the electrical traces therein.

13. The sensor shifting module of claim 12, wherein the supporting portion comprises a guide disposed between the movable portion and the fixed portion and connected to the movable portion and the fixed portion through the plurality of bridges.

14. The sensor shifting module of claim 13, wherein the plurality of bridges includes first bridges extending from the movable portion to the guide in a second direction orthogonal to the first direction and second bridges extending from the guide to the fixed portion in a third direction orthogonal to the first direction, and the second direction and the third direction intersect each other.

15. A camera module comprising:
the sensor shifting module of claim 1; and
a lens barrel comprising at least one lens,
wherein light incident through the at least one lens strikes the imaging plane in the first direction.

16. A camera module, comprising:
a lens module comprising at least one lens; and
a sensor shifting module,
wherein the sensor shifting module comprises:
a fixed body;
a first movable body movably disposed on the fixed body and coupled to an image sensor oriented in a first direction; and
a first driver configured to rotate the first movable body about an axis orthogonal to the first direction with respect to the fixed body,
wherein the first driver comprises a tilt actuator disposed between the fixed body and the first movable body, and the tilt actuator comprises a first driving element disposed on one of the first movable body and the fixed body and a second driving element disposed on the other of the first movable body and the fixed body,
wherein one of the first driving element and the second driving element is a coil, and the other is one of a coil, a magnet, and a yoke, and
wherein the first movable body rotates by electromagnetic interaction between the first driving element and the second driving element.

17. The camera module of claim 16, wherein the first driver comprises an elastic member disposed between the fixed body and the first movable body, and the elastic member is compressed according to tilting of the first movable body.

18. The camera module of claim 16, further comprising:
a second movable body movably disposed on the first movable body and coupled to the image sensor; and
a second driver configured to move the second movable body in a direction orthogonal to the first direction with respect to the first movable body,
wherein the second driver comprises a driving coil coupled to one of the first movable body and the second movable body, and a driving yoke coupled to the other,
wherein the driving yoke opposes the driving coil in a direction orthogonal to the first direction, and
wherein, when a current is applied to the driving coil, the second movable body moves in a direction orthogonal to the first direction by electromagnetic interaction arising between the driving coil and the driving yoke.

19. A sensor shifting module, comprising:
an image sensor comprising an imaging plane oriented in a first direction;
a tilt guide ball;
a first movable body rotatably disposed on the tilt ball and supporting the image sensor; and
a tilt actuator configured to rotate the first movable body about an axis through the tilt guide ball orthogonal to the first direction,
wherein the tilt actuator comprises a first driving element disposed on the first movable body and a second driving element facing the first driving element in the first direction,
wherein, the first driving element is a coil or a yoke, and when the first driving element is a coil, the second driving element is a coil or a yoke, and when the first driving element is a yoke, the second driving element is a coil, and wherein the first movable body rotates by electromagnetic interaction between the first driving element and the second driving element.

20. A camera module comprising:

the sensor shifting module of claim 19; and a lens barrel comprising at least one lens, wherein light incident through the at least one lens strikes the imaging plane in the first direction.

* * * * *